US010346597B2

(12) United States Patent
Yang et al.

(10) Patent No.: US 10,346,597 B2
(45) Date of Patent: Jul. 9, 2019

(54) METHOD FOR SCREEN UNLOCKING, METHOD FOR IMAGE ACQUIRING, AND ELECTRONIC TERMINAL

(71) Applicant: Guangdong Oppo Mobile Telecommunications Corp., Ltd., Dongguan, Guangdong (CN)

(72) Inventors: Le Yang, Guangdong (CN); Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/988,879

(22) Filed: May 24, 2018

(65) Prior Publication Data

US 2018/0268117 A1    Sep. 20, 2018

Related U.S. Application Data

(63) Continuation of application No. 15/824,508, filed on Nov. 28, 2017, now Pat. No. 10,289,818, which is a (Continued)

(30) Foreign Application Priority Data

Mar. 16, 2016 (CN) .......................... 2016 1 0151309

(51) Int. Cl.
*G06F 21/31* (2013.01)
*G06F 3/01* (2006.01)
(Continued)

(52) U.S. Cl.
CPC .............. *G06F 21/31* (2013.01); *G06F 3/011* (2013.01); *G06K 9/00013* (2013.01);
(Continued)

(58) Field of Classification Search
CPC .................................. G06F 21/31; H04L 63/08
See application file for complete search history.

(56) References Cited

U.S. PATENT DOCUMENTS

| 6,049,620 A * | 4/2000 | Dickinson | G01B 7/004 |
| | | | 382/108 |
| 6,330,345 B1 | 12/2001 | Russo et al. | |

(Continued)

FOREIGN PATENT DOCUMENTS

| CN | 101777115 A | 7/2010 |
| CN | 102833423 A | 12/2012 |

(Continued)

OTHER PUBLICATIONS

Extended European search report issued in corresponding European application No. 16894082.3 dated Mar. 26, 2018.

*Primary Examiner* — Samson B Lemma
*Assistant Examiner* — Arya Golriz
(74) *Attorney, Agent, or Firm* — Young Basile Hanlon & MacFarlane, P.C.

(57) ABSTRACT

A method for screen unlocking, a method for image acquiring, and an electronic terminal are provided. In the method for screen unlocking, a most frequently used debug parameter is counted according to recorded debug parameters used for image selection in the most recent N instances. Auto-adjustment is performed on the debug parameters from the most frequently used debug parameter, and an image current acquired is debugged with the debug parameters adjusted, to obtain debugged images. A target fingerprint image is selected from the debugged images. Whether the target image satisfies an unlocking condition is identified and a screen of the electronic terminal is unlocked when the unlocking condition is satisfied. Accordingly, a method for image acquiring and an electronic terminal are also provided.

16 Claims, 9 Drawing Sheets

Related U.S. Application Data continuation of application No. PCT/CN2016/087777, filed on Jun. 29, 2016.

(51) Int. Cl.
*G06K 9/00* (2006.01)
*H04L 29/06* (2006.01)
*H04W 12/06* (2009.01)

(52) U.S. Cl.
CPC .......... *G06K 9/00087* (2013.01); *H04L 63/08* (2013.01); *H04W 12/06* (2013.01)

(56) References Cited

U.S. PATENT DOCUMENTS

| | | | | |
|---|---|---|---|---|
| 8,838,071 | B1* | 9/2014 | Cronin | G06F 3/0482 455/411 |
| 2004/0153428 | A1 | 8/2004 | Reid et al. | |
| 2004/0221790 | A1* | 11/2004 | Sinclair | G01C 22/02 116/62.1 |
| 2007/0274575 | A1 | 11/2007 | Russo | |
| 2008/0212846 | A1* | 9/2008 | Yamamoto | G06K 9/00087 382/115 |
| 2013/0265451 | A1 | 10/2013 | Son et al. | |
| 2013/0287271 | A1 | 10/2013 | Harper | |
| 2015/0023571 | A1 | 1/2015 | Gozzini et al. | |
| 2015/0261996 | A1* | 9/2015 | Kim | G06K 9/00255 348/14.03 |

FOREIGN PATENT DOCUMENTS

| | | |
|---|---|---|
| CN | 103886239 A | 6/2014 |
| CN | 104239107 A | 12/2014 |
| CN | 104252621 A | 12/2014 |
| CN | 105159585 A | 12/2015 |
| CN | 105303090 A | 2/2016 |
| CN | 105335713 A | 2/2016 |
| CN | 105335739 A | 2/2016 |
| CN | 105550647 A | 5/2016 |
| KR | 20050038137 A | 4/2005 |

* cited by examiner

METHOD FOR SCREEN UNLOCKING, METHOD FOR IMAGE ACQUIRING, AND ELECTRONIC TERMINAL

CROSS-REFERENCE TO RELATED APPLICATION

This application is a continuation of U.S. Ser. No. 15/824,508, filed on Nov. 28, 2017, which is a continuation of International Application No. PCT/CN2016/087777, filed on Jun. 29, 2016, which claims priority to Chinese Patent Application No. 201610151309.X, filed on Mar. 16, 2016, the contents of all of which are herein incorporated by reference in their entireties.

TECHNICAL FIELD

The present disclosure relates to the field of computers, and particularly to a method for screen unlocking, a method for image acquiring, and an electronic terminal.

BACKGROUND

With the development of electronic technology and the Internet, functions of mobile terminals are also diversified. For example, users can get various consulting information or even do a lot of things without leaving home with aid of client products that can be installed on the mobile terminal according to users' actual needs, and people's life and entertainment are increasingly inseparable from electronic terminals.

At present, fingerprint recognition technology has become a standard configuration of mainstream terminals. Fingerprint recognition can be used for screen unlocking, wake-up and other functions of the mobile terminal. Besides, fingerprint recognition is also an important part of mobile payment.

The process of fingerprint recognition can be achieved as extracting features, saving data, and comparing. At the beginning, a fingerprint image of a user is read or acquired by a fingerprint reader, an original image is then processed preliminary to make the original image clearer after the fingerprint image is acquired, thereafter, a feature point matching is performed on the processed original image and registered fingerprint templates. A system can be unlocked when the matching is successful. The time from reading the fingerprint image to unlocking the system is called unlocking time.

The length of the unlocking time has become one aspect of competition of various manufacturers. How to improve unlocking speed and shorten the unlocking time has become a technical problem to be solved in the field.

BRIEF DESCRIPTION OF THE DRAWINGS

In order to illustrate the technical solutions of the implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Figure 1:
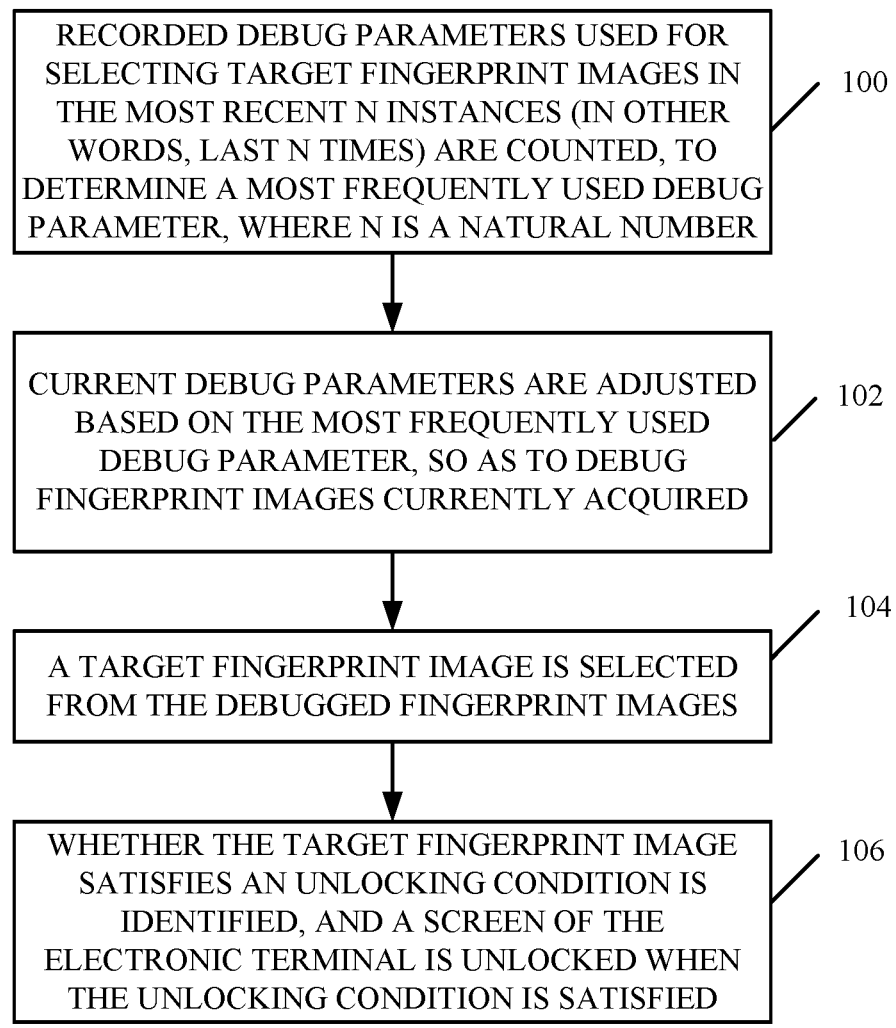
FIG. 1 is a schematic flow diagram illustrating a method for screen unlocking of an electronic terminal according to an implementation of the present disclosure.

Hereinafter, technical solutions embodied by the implementations of the disclosure will be described in a clear and comprehensive manner in reference to the accompanying drawings intended for the implementations. It is evident that the implementations described herein constitute merely some rather than all of the implementations of the disclosure, and that those of ordinary skill in the art will be able to derive other implementations based on these implementations without making inventive efforts, which all such derived implementations shall all fall in the protection scope of the disclosure.

It is to be understood that the terminology used in the implementations of the present disclosure is for the purpose of describing particular implementations only and is not intended to limit the disclosure. Unless the context clearly dictates otherwise, phrases such as "a/an", "the", "one" and the like used in the implementations of the disclosure and the appended claims are also intended to include a majority. It is also to be understood that the phrase "and/or" used herein refers to and encompasses any or all of the possible combinations of one or more associated listed items. For example, for the purpose of the present disclosure, the phrases "A and/or B" and "A or B" mean (A), (B), or (A and B).

As discussed herein, the term "module" may be used to refer to one or more physical or logical components or elements of a system. In some implementations, a module may be a distinct circuit, while in other implementations a module may include a plurality of circuits.

Capacity Auto Control (CAC) Parameter

A CAC parameter includes "ADC shift or ADC offset", "ADC gain", and "pixel gain". CAC adjustment refers to the adjustment of "ADC shift", "ADC gain", "pixel gain" and the like.

"ADC shift" refers to the shift of an analog-to-digital converter (ADC). Each finger is different and a fingerprint recognition sensor (also known as fingerprint sensor) can be configured to debug captured images via different parameters. Assume that a fingerprint identification sensor includes 56*172 pixels, each pixel corresponds to a pixel value when acquiring fingerprint images, therefore, a total of 10,752 pixel values can be obtained, most of which are between 0.4 and 0.8 and are different, and then a pixel distribution profile can be formed. The ADC shift can be at different levels, and the higher the level, the greater the overall value of the pixel distribution profile, and the darker the fingerprint image will be.

"ADC gain" refers to the gain of the ADC and is used to adjust the distribution or dispersion of the pixel distribution profile; the greater the gain, the more dispersed the pixel distribution file, on the other hand, the smaller the gain, the more concentrated the pixel distribution profile; the more dispersed the pixel distribution profile, the higher the contrast of an image acquired or received, and originally darker pixels in the fingerprint image will be even darker while originally whiter pixels in the fingerprint image will be even whiter.

"Pixel gain" refers to the gain of a pixel and can be determined by a capacitor connected in parallel with an amplifier. The amplifier is connected in parallel with multiple capacitors and each capacitor can be controlled by a switch. The more the number of closed switches, the greater the gain, the larger the pixel value, and the stronger the signal strength.

During a control process of the ADC, generally, the "pixel gain" is fixed and therefore, the control process of the ADC mainly refers to the adjustment of the "ADC shift" for adjusting the location of the whole pixel distribution profile and the "ADC gain" for adjusting the concentration and dispersion. Everyone's fingers are different and therefore, the fingerprint images acquired need to be adjusted with different parameters. Suppose the ADC shift and the ADC gain each has five levels, twenty-five sets (each set includes one ADC shift and one ADC gain) can be obtained. Each set can be used to acquire one fingerprint image and consequently, totally twenty-five fingerprint images can be acquired each time. One of the twenty-five fingerprint images will be selected for subsequent matching.

Implementations of the present disclosure provide a method for screen unlocking of an electronic terminal, which allows unlocking screen quickly.

In implementations of the present disclosure, in the case of fingerprint unlocking, CAC parameters are variable for different fingerprint acquiring modules and different fingers (dry or wet finger) of users. However, for a single electronic terminal and a separate user, because the performance of a fingerprint acquiring module has been decided at factory and information on a finger of the user is fixed, in daily usage, CAC parameters corresponding to a finger of a user using a terminal are invariant. Based on this, in the method provided herein, when acquiring fingerprint images, debug parameters currently used for acquiring fingerprint images can be adjusted based on the most frequently used debug parameter, which is determined from among recorded debug parameters used for selecting target fingerprint images in the most recent N instances, so as to debug the fingerprint images acquired. A target fingerprint image is then selected from the debugged fingerprint images. The screen of the electronic terminal is unlocked when the target fingerprint image satisfies the unlocking condition.

The method will be described in detail with reference to the accompanying drawings.

FIG. 1 is a schematic flow diagram illustrating a method for screen unlocking of an electronic terminal according to implementations of the present disclosure. The method may include the following.

At block 100, recorded debug parameters used for selecting target fingerprint images in the most recent N instances (in other words, last N times) are counted, to determine a most frequently used debug parameter, where N is a natural number.

In one implementation, when the electronic terminal receives or acquires a fingerprint image(s) entered by a user through an acquiring module such as a fingerprint sensor and so on, it is necessary to adjust debug parameters for several times to obtain clear fingerprint images. To this end, fingerprint images acquired via the fingerprint sensor, for example, are processed (that is, debugged) with the adjusted debug parameters to obtain some debugged fingerprint images, and then a fingerprint image with the highest clarity will be selected, from among the debugged fingerprint images, as a target fingerprint image for subsequent identifying. In some implementations, the target fingerprint image can be one having clarity greater than a threshold.

It is to be understood that, according to the method for screen unlocking of the implementation of the present disclosure, prior to block 100, each time a fingerprint image with the highest clarity (that is, the target fingerprint image) is selected, debug parameters that are adopted to obtain the fingerprint image with the highest clarity can be recorded. At block 100, the recorded debug parameters used in the most recent N instances for selecting the target fingerprint images can be read out, and the most frequently used debug parameter can be determined from among the recorded debug parameters. For example, determining the most frequently used debug parameter recorded in the whole historical time, in a certain time period or the like, can be considered as determining the most frequently used debug parameter in the implementation of the present disclosure.

As one implementation, the recorded debug parameters used in the most recent N instances for selecting the target fingerprint images can be ranked in a descending order according to the frequency of use, so as to determine the most frequently used debug parameter.

The debug parameter referred to in the implementations of the disclosure may include a capacity auto control (CAC) parameter, which may, in turn, includes ADC gain, pixel gain, ADC gain and the like. In other words, the debug parameter may include at least one of a Gain parameter, an analog-to-digital converter (ADC) parameter, and a pixel gain parameter and the like. As mentioned above, one debug parameter may include ADC shift, ADC gain, and pixel gain, more particularly, may include ADC shift and ADC gain.

At block 102, current debug parameters are adjusted based on the most frequently used debug parameter, so as to debug fingerprint images currently acquired. The phrase "current debug parameters" means debug parameters currently used for acquiring fingerprint images. In the following, the phrase "fingerprint image" can be referred to "image" for short. The process of adjusting debug parameters at block 102 can be understood as a CAC adjusting.

In some implementations, the most frequently used debug parameter can be a basis for auto-adjusting ("adjusting" for short), that is, adjusting can be conducted by using the most frequently used debug parameter. Adjusting can be performed in milliseconds. The fingerprint images currently acquired can be debugged by using the adjusted debug parameters to obtain debugged fingerprint images.

In some implementations, the recorded debug parameters ranked in the descending order can be used sequentially to adjust the current debug parameters, in case that the current debug parameters adjusted on the basis of the most frequently used debug parameter still cannot be used to obtain fingerprint images clear enough for fingerprint identification. In other words, in some implementations of the present disclosure, the current debug parameters can be adjusted with the ranked recorded debug parameters starting with the most frequently used debug parameter.

At block 104, a target fingerprint image is selected from the debugged fingerprint images.

In one implementation, a fingerprint image with the highest clarity can be selected as the target fingerprint image for subsequent image identification and unlocking. Additionally, or alternatively, signal-to-noise ratios of the debugged fingerprint images can be analyzed and compared to determine the target fingerprint image. In this situation, the target fingerprint image can be a fingerprint image with the largest signal-to-noise ratio, that is, a fingerprint image with the highest and best clarity.

At block 106, whether the target fingerprint image satisfies an unlocking condition is identified, and a screen of the electronic terminal is unlocked when the unlocking condition is satisfied.

In some implementations, the unlocking condition can be set in advance. The unlocking condition may be that, for example, the target fingerprint image matches with an image for unlocking authentication, the target fingerprint image have certain preset feature information and the like. The screen of the electronic terminal is unlocked when the target fingerprint image satisfies the preset unlocking condition.

The present disclosure only needs to adjust debug parameters a small number of times to achieve the acquisition of fingerprint images, resolving the problem in the related art that acquisition of fingerprint images takes a longer time due to dozens or even hundreds of adjustments on debug parameters, thereby reducing the amount of memory required for image processing, increasing the running speed of a processor of a terminal, increasing the efficiency of fingerprint image acquisition, reducing screen unlocking time, and enabling the user to unlock the screen safely and quickly.

The following describes a mobile terminal as an example of the electronic terminal. The screen unlock pattern of the mobile terminal can be a screen-on unlock pattern, a screen-off unlock pattern, or a screen-off press-to-unlock pattern. Among them, the screen-off press-to-unlock pattern means that, the mobile terminal is provided with a dome button and screen unlocking may only be triggered by pressing the dome button with a finger of a user. For the user, in the screen-on unlock pattern, "screen unlocking time" refers to a duration from touching a fingerprint identification module with a finger to displaying an unlocking interface; in the screen-off unlock pattern, "screen unlocking time" refers to a duration from touching the fingerprint identification module with a finger to lighting up (that is, waking up) the screen and displaying the unlocking interface; in the screen-off press-to-unlock pattern, "screen unlocking time" refers to a duration from pressing the dome button to lighting up the screen and displaying the unlocking interface.

Figure 2:
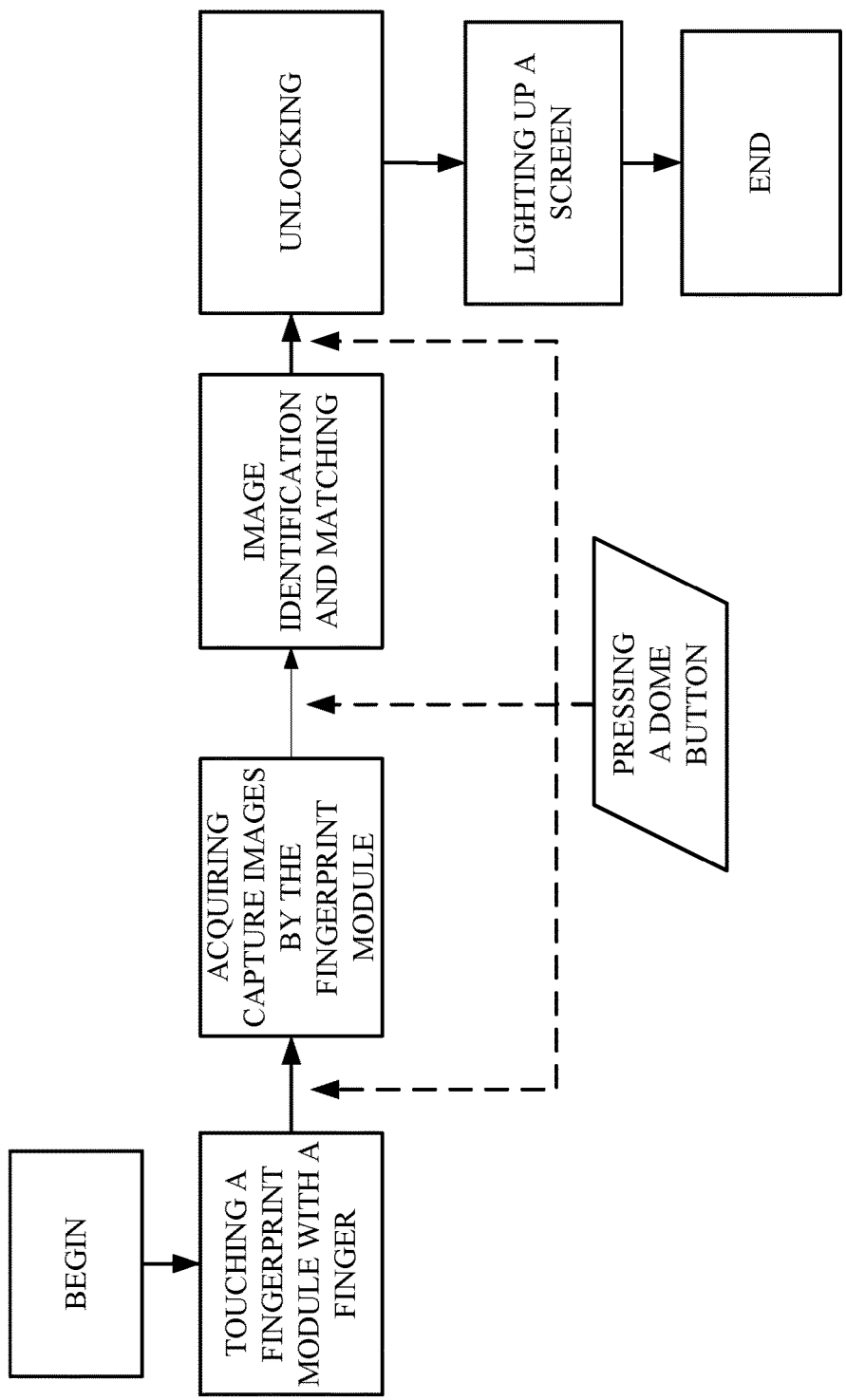
FIG. 2 is a schematic flow diagram illustrating a principle of screen unlocking of an electronic terminal according to an implementation of the present disclosure.

In view of the screen-off unlock pattern, FIG. 2 is a schematic flow diagram illustrating a principle of screen unlocking of an electronic terminal according to an implementation of the present disclosure. The method for screen unlocking will be described in detail below.

Before receiving by the electronic terminal an operation instruction of pressing the dome button, finger-touch of the user may be detected by the dome button, that is, an interrupt request (IRQ) may be received. Then the operation of determining the most frequently used debug parameter from among the recorded debug parameters used for selecting target fingerprint images in the most recent N instances may be triggered. Such operation can refer to the above description of block 100 and will not be described in further detail herein. Thereafter, debug parameters are adjusted based on the most frequently used debug parameter, so as to debug fingerprint images currently acquired or received. Additionally, or alternatively, signal-to-noise ratios of the debugged fingerprint images can be analyzed and compared to determine a target fingerprint image. In this situation, the target fingerprint image can be an image with the largest signal-to-noise ratio, that is, an image with the highest and best clarity.

Finally, it is identified whether the target fingerprint image matches with a fingerprint image for unlocking authentication, the screen of the electronic terminal will be unlocked and lit up when the target fingerprint image is matched and the operation instruction of pressing the dome button is received.

The operation instruction of pressing the dome button entered by the user can be received by the electronic terminal at different stages during unlocking, that is, the operation of pressing the dome button by the user can be performed at different stages of unlocking. For example, as illustrated in FIG. 2, pressing of the dome button may be subsequent to touching a fingerprint module with the finger of the user (that is, placing a finger on the fingerprint module) and prior to acquiring fingerprint images by the fingerprint module, or subsequent to acquiring the fingerprint images by the fingerprint module and prior to image identification and matching, or subsequent to image identification and matching and prior to unlocking.

In the implementation of the present disclosure, if image identification fails, the screen would not be unlocked and a prompt message indicating a failed identification may be output to the user.

With aid of technical schemes of implementations of the present disclosure, the problem in the related art that acquisition of fingerprint images takes longer time due to dozens or even hundreds of adjustments on debug parameters can be resolved, thereby increasing the efficiency of fingerprint image acquisition and reducing screen unlocking time. When the user presses the dome button not so fast (for example, the dome button is pressed after image identification and matching is completed and before the unlocking is completed), he or she will still be able to further experience instant unlocking.

Figure 3:
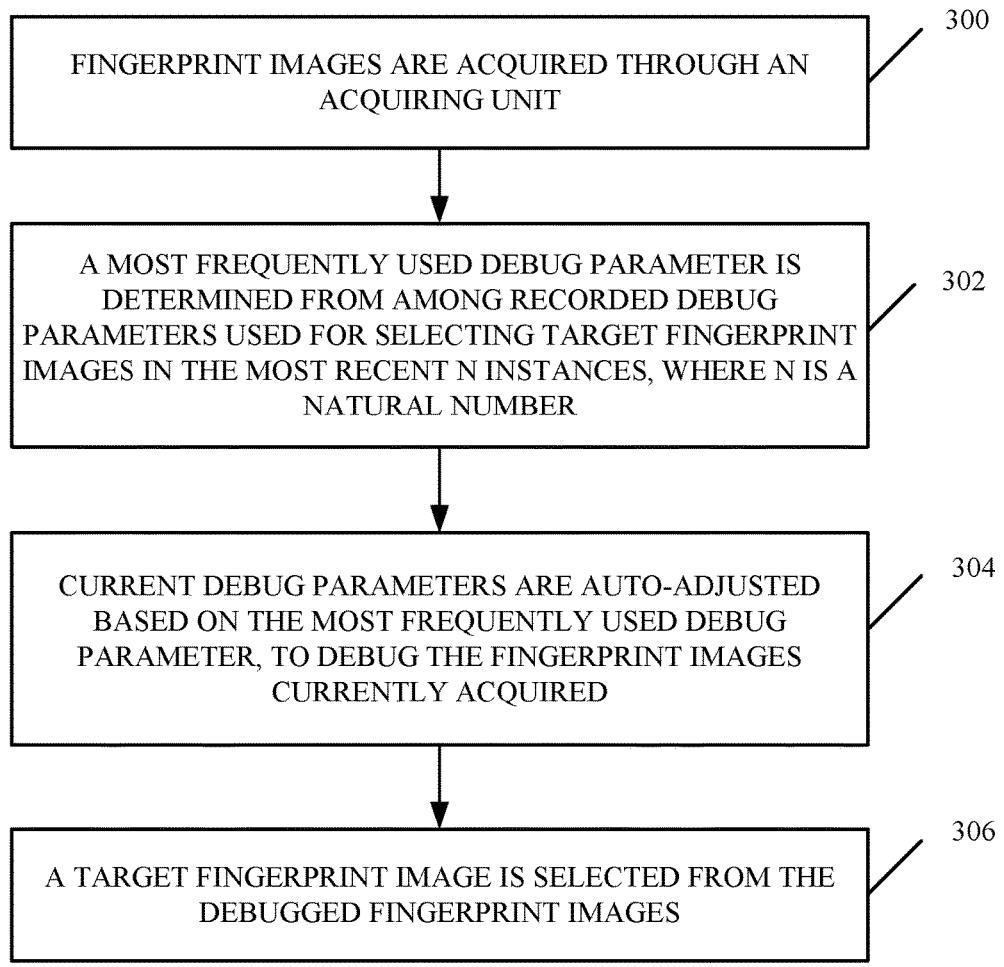
FIG. 3 is a schematic flow diagram illustrating an image acquiring method according to the present disclosure.

Furthermore, implementations of the present disclosure also provide an image acquiring method. FIG. 3 is a schematic flow diagram illustrating an image acquiring method according to the present disclosure. The method may include the following.

At block 300, fingerprint images are acquired through an acquiring module such as a fingerprint identification sensor.

At block 302, a most frequently used debug parameter is determined from among recorded debug parameters used for selecting target fingerprint images in the most recent N instances, where N is a natural number.

At block 304, debug parameters currently used for acquiring fingerprint images are adjusted based on the most frequently used debug parameter, to debug fingerprint images currently acquired.

At block 306, a target fingerprint image used for subsequent fingerprint matching or identification is selected from the debugged fingerprint images.

In one implementation, signal-to-noise ratios of the debugged fingerprint images can be compared to select an image with the largest signal-to-noise ratio as the target fingerprint image.

The image acquiring method illustrated in FIG. 3 can refer to the descriptions regarding how image acquisition is completed as illustrated in FIG. 1 and FIG. 2, and will not be described in further detail herein.

The implementation of the present disclosure only needs to adjust debug parameters a small number of times to achieve the acquisition of fingerprint images, the problem in the related art that acquisition of fingerprint images takes long time due to dozens or even hundreds of adjustments on debug parameters can be resolved, thereby saving the time of fingerprint image acquisition and increasing the efficiency of fingerprint image acquisition.

Figure 4:
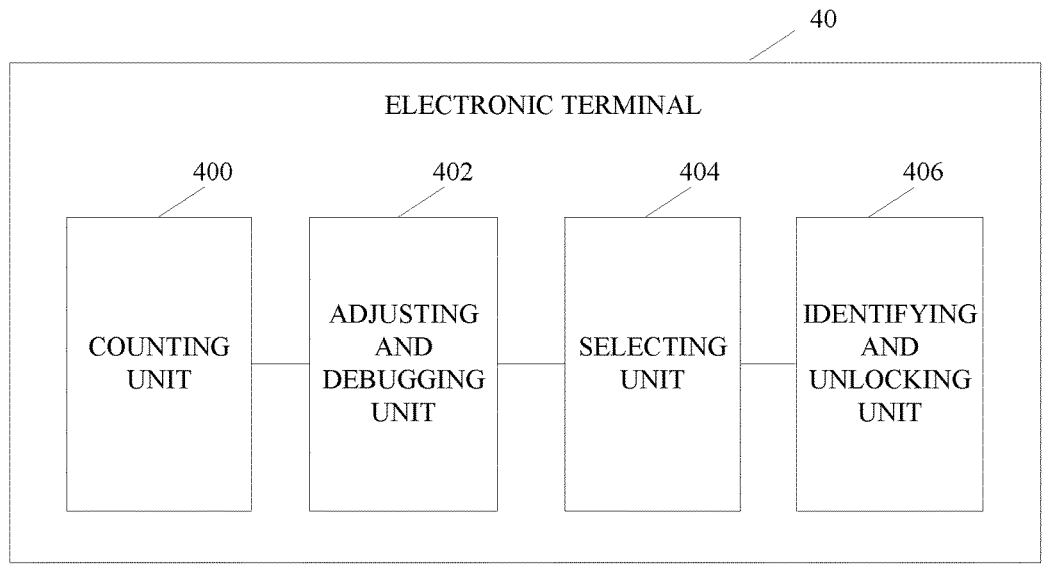
FIG. 4 illustrates a schematic structural diagram of an electronic terminal according to an implementation of the present disclosure.

In order to better implement technical solutions, the above-described implementations of the present disclosure, the present disclosure also provides an electronic terminal. FIG. 4 illustrates a schematic structural diagram of an electronic terminal according to an implementation of the present disclosure. An electronic terminal 40 may include a counting unit 400, an adjusting and debugging unit 402, a selecting unit 404, and an identifying and unlocking unit 406.

The counting unit 400 is configured to count recorded debug parameters used for selecting target fingerprint images in the most recent N instances, to determine a most frequently used debug parameter, where N is a natural number. In some implementations, the counting unit 400 can be implemented through a counter, an adder, a counting circuit, and the like.

The adjusting and debugging unit 402 is configured to adjust debug parameters currently used for acquiring fingerprint images, based on the most frequently used debug parameter, so as to debug fingerprint images currently acquired. The adjusting and debugging unit 402 can be implemented through a processor, a regulator, a regulating circuit, and the like.

In at least one implementation, the counting unit 400 is further configured to rank the recorded debug parameters in a descending order according to the frequency of use. The adjusting and debugging unit 402 is further configured to adjust the debug parameters currently used for acquiring fingerprint images by using other debug parameters except the most frequently used parameter of the ranked recorded debug parameters sequentially. Alternatively, the first adjusting and debugging unit 402 may be further configured to adjust debug parameters obtained through the adjustment with the most frequently used debug parameter, by using a debug parameter ranked after the most frequently used debug parameter. The rest can be done in the same manner.

The selecting unit 404 is configured to select a target fingerprint image from the debugged images. The first selecting unit 404 can be implemented through a data selector, image selector, a controller, a selecting circuit, and the like.

The identifying and unlocking unit 406 is configured to identify whether the target fingerprint image satisfies an unlocking condition, and to unlock a screen of the electronic terminal when the unlocking condition is satisfied. The identifying and unlocking unit 406 can be implemented as a fingerprint identification module.

Figure 5:
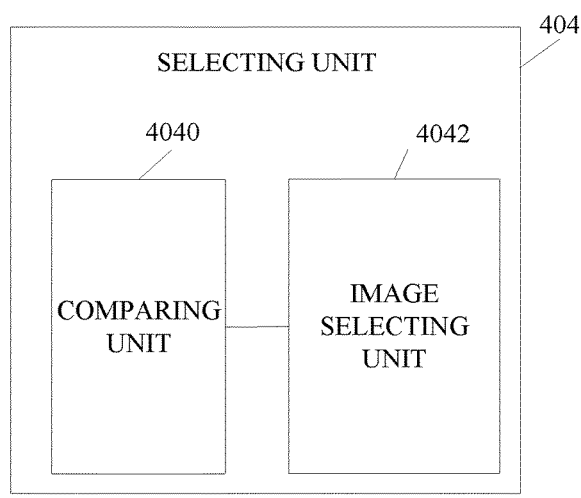
FIG. 5 is a schematic structural diagram illustrating a first selecting unit according to the present disclosure.

FIG. 5 is a schematic structural diagram illustrating the first selecting unit according to an implementation of the present disclosure. The selecting unit 404 may further include a comparing unit 4040 and an image selecting unit 4042.

The comparing unit 4040 is configured to compare signal-to-noise ratios of the debugged images.

The image selecting unit 4042 is configured to select an image with the largest signal-to-noise ratio as the target fingerprint image.

Figure 6:
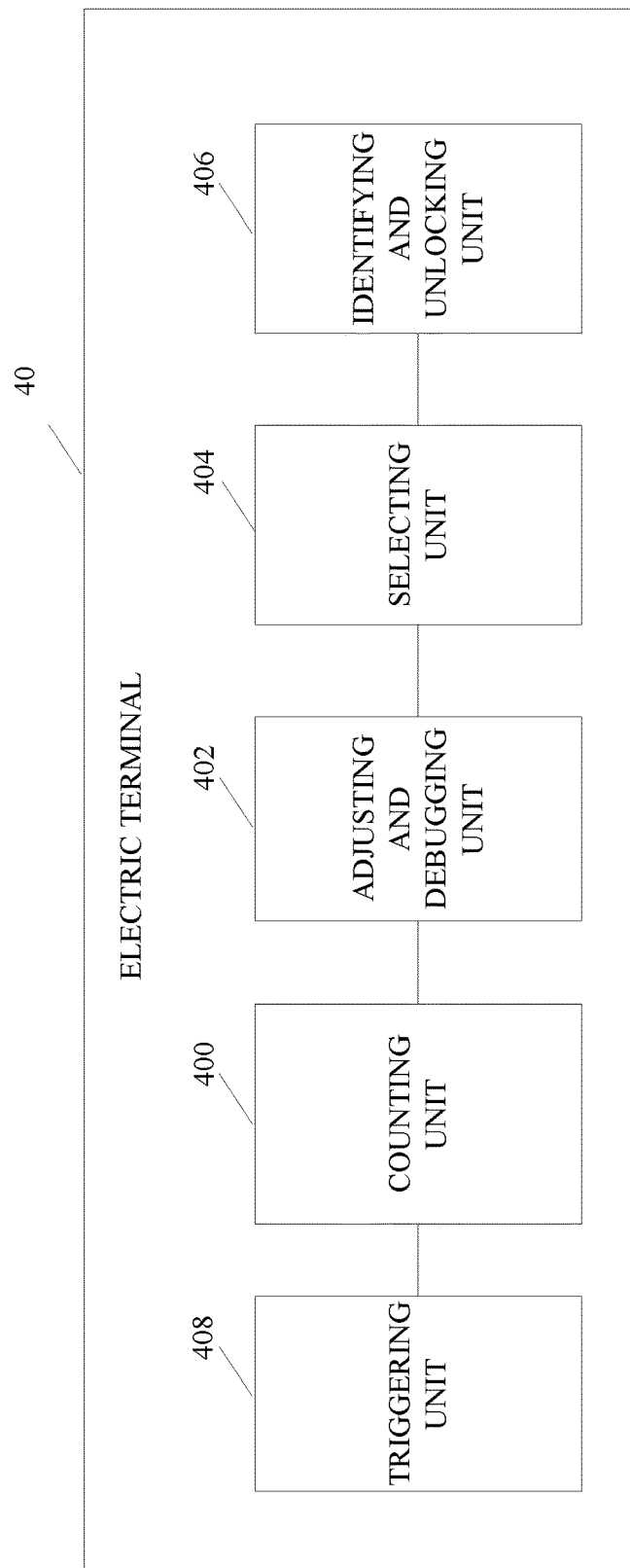
FIG. 6 is a schematic structural diagram illustrating an electronic terminal according to another implementation of the present disclosure.

Furthermore, the electronic terminal 40 is provided with a dome button (not illustrated in FIG. 4), which is configured to receive or detect a touch operation and/or a press operation of a finger of a user. Screen unlocking may be triggered by a press operation received by the dome button, that is, by pressing the dome button with a finger of a user. FIG. 6 is a schematic structural diagram illustrating an electronic terminal according to another implementation of the present disclosure, in which the electronic terminal 40 is in a screen-off lock-screen state.

As illustrated in FIG. 6, in addition to the counting unit 400, the adjusting and debugging unit 402, the selecting unit 404, and the identifying and unlocking unit 406, the electronic terminal 40 may further include a triggering unit 408. The triggering unit 408 is configured to trigger the counting unit 400 to execute the operation of counting the recorded debug parameters used for selecting the target fingerprint images in the most recent N instances to determine the most frequently used debug parameter, when a finger-touch is detected via the dome button before an operation instruction of pressing the dome button is received. The triggering unit 408 can be implemented through a controller, a trigger, a switch, a triggering circuit, or any other components with triggering function.

Figure 7:
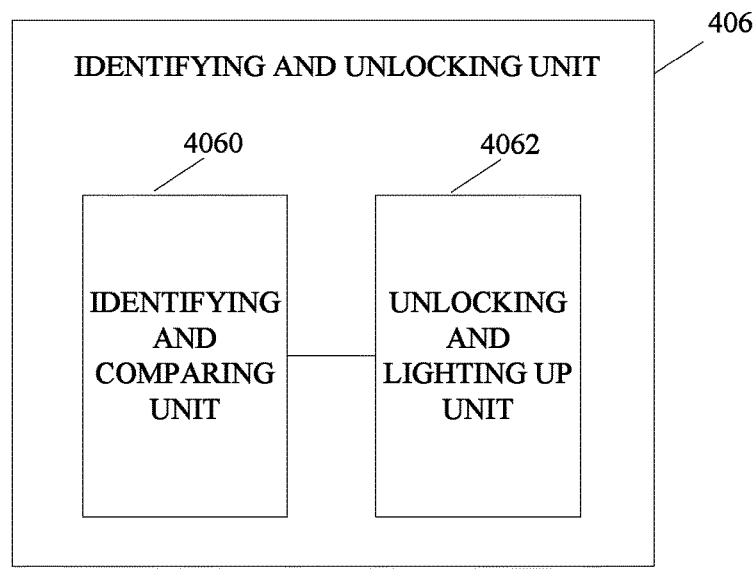
FIG. 7 is a schematic structural diagram illustrating an identifying and unlocking unit according to an implementation of the present disclosure.

Furthermore, FIG. 7 is a schematic structural diagram illustrating the identifying and unlocking unit according to an implementation of the present disclosure. The identifying and unlocking unit 406 may include an identifying and comparing unit 4060 and an unlocking and lighting up unit 4062. The identifying and comparing unit 4060 can be implemented as a fingerprint identification sensor. The unlocking and lighting up unit 4062 can be implemented through a controller such as a screen controller.

The identifying and comparing unit 4060 is configured to identify whether the target fingerprint image matches with a preset image for unlocking authentication.

The unlocking and lighting up unit 4062 is configured to unlock and light up a screen of the electronic terminal 40 when the target fingerprint image is matched and the operation instruction of pressing the dome button is received.

Furthermore, in implementations of the present disclosure, the debug parameter may include at least one of a Gain parameter(s), an analog-to-digital converter (ADC) parameter(s), a pixel gain parameter(s) and the like.

Figure 8:
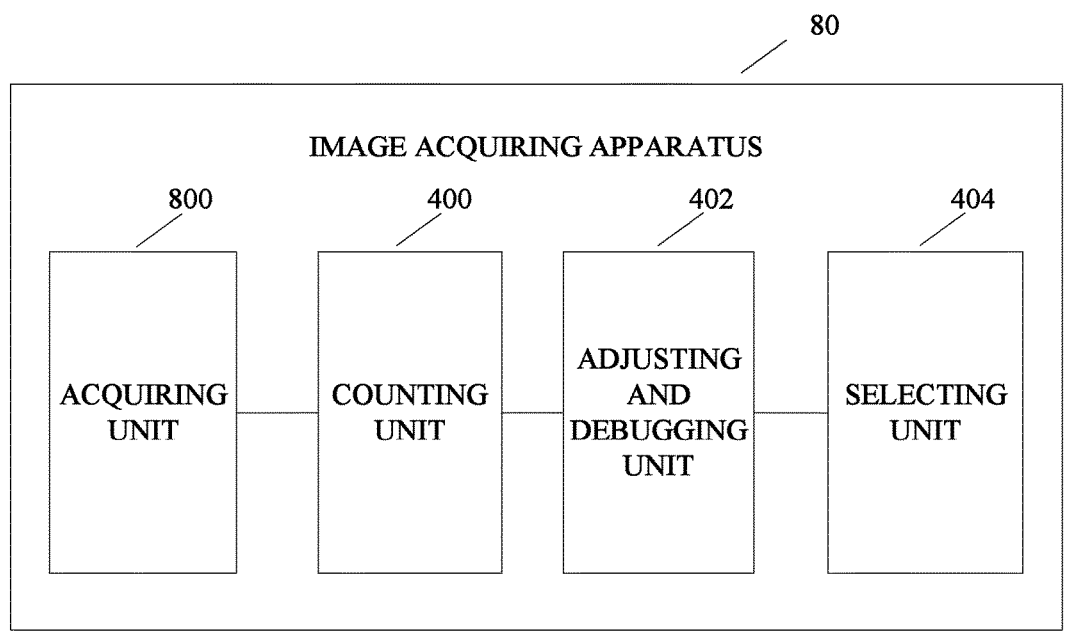
FIG. 8 is a schematic structural diagram illustrating an image acquiring apparatus according to an implementation of the present disclosure.

In order to better implement the above-described implementations of the present disclosure, the present disclosure also provides an image acquiring apparatus. FIG. 8 is a schematic structural diagram illustrating an image acquiring apparatus according to an implementation of the present disclosure. In addition to the counting unit 400, the adjusting and debugging unit 402, and the selecting unit 404, the image acquiring apparatus 80 illustrated in FIG. 8 further includes an acquiring unit 800. The image acquiring apparatus can be a fingerprint identification module or a fingerprint sensor embodied in a terminal.

The acquiring unit 800 is configured to acquire images, to be specific, fingerprint images.

The components of the image acquiring apparatus 80 are similar to those of the electronic terminal 40 and will not be repeated here to avoid redundancy. Continuing, the function of each component of the electronic terminal 40 in implementations of the present disclosure can be configured to implement the methods of according to implementations of the present disclosure, and the details thereof can refer to the method described above and will not be repeated here.

Figure 9:
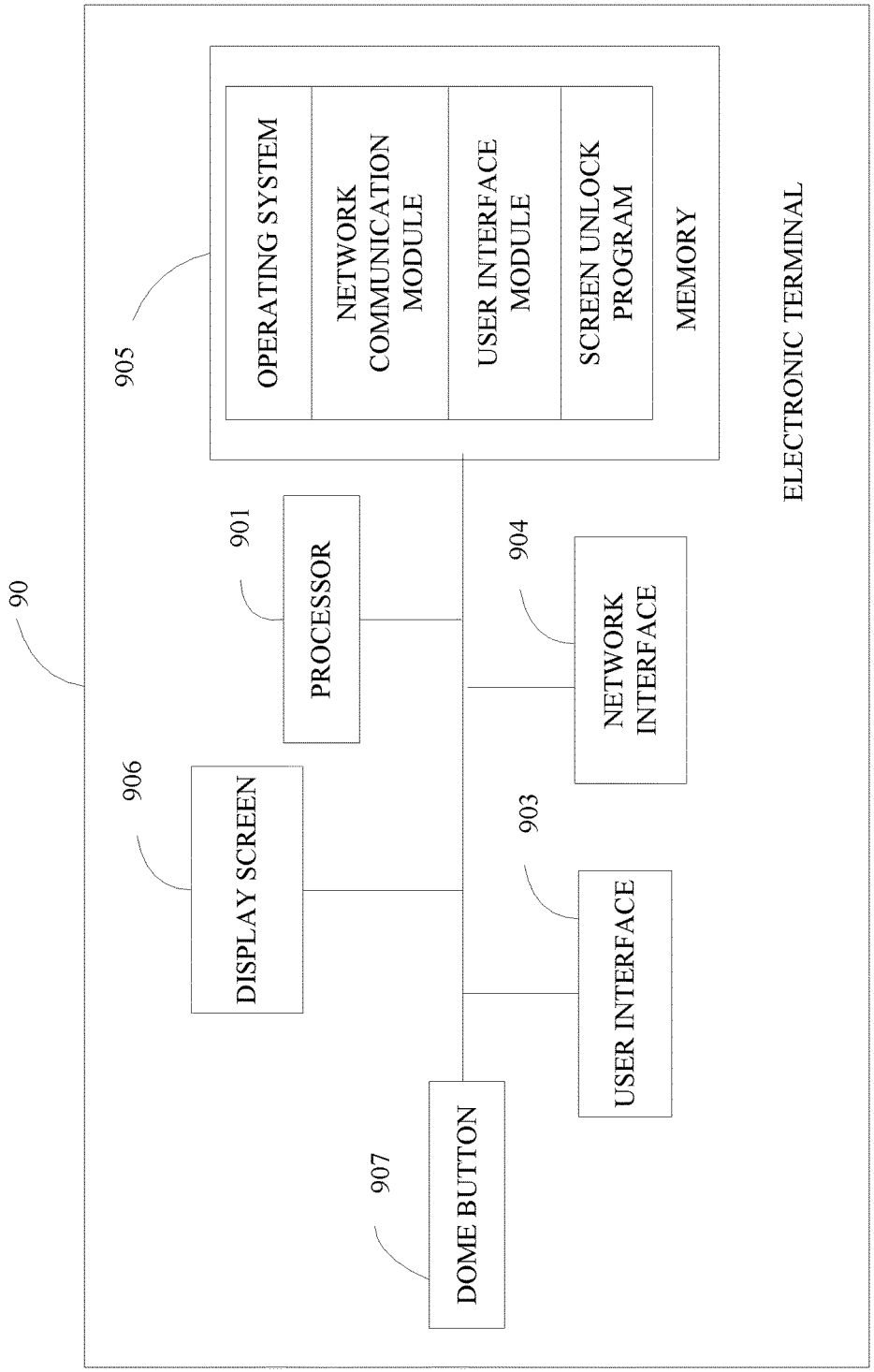
FIG. 9 is a schematic structural diagram illustrating an electronic terminal according to another implementation of the present disclosure.

FIG. 9 is a schematic structural diagram illustrating an electronic terminal according to another implementation of the present disclosure. As shown in FIG. 9, an electronic terminal 90 may include at least one processor 901, such as a CPU, at least one network interface 904, a user interface 903, a memory 905, at least one communication bus 902, a display screen 906, and a dome button 907. The dome button 907 can be integrated in or connected to a fingerprint sensor. Wherein the communication bus 902 is configured to connect these components to communicate with each other. The user interface 903 may include a keyboard or a mouse and the like. The network interface 904 may alternatively include a standard wired interface, a standard wireless interface (e.g., a WI-FI interface). The memory 905 may be a high-speed RAM memory, or may be a non-volatile memory, such as at least one disk memory, the memory 905 may include a flash in the implementation of the present disclosure. The memory 905 may alternatively be at least one storage system located remotely from the processor 901. As illustrated in FIG. 9, the memory 905, as a computer storage medium, may include an operating system, a network communication module, a user interface module, and a screen unlock program.

The processor 901 may be configured to invoke the screen unlock program stored in the memory 905 to perform the following operations.

Recorded debug parameters for selecting target fingerprint images in the most recent N instances are counted, to determine a most frequently used debug parameter, where N is a natural number.

Debug parameters currently used for acquiring fingerprint images are adjusted based on the most frequently used debug parameter, so as to debug fingerprint images currently acquired.

A target fingerprint image is selected from the debugged fingerprint images.

Whether the target fingerprint image satisfies an unlocking condition is identified, and a screen of the electronic terminal 90 is unlocked when the unlocking condition is satisfied.

In one implementation, the processor 901 configured to select the target fingerprint image from the debugged fingerprint images is further configured to: compare signal-to-noise ratios of the debugged fingerprint images, and select a fingerprint image with the largest signal-to-noise ratio as the target fingerprint image.

In one implementation, the electronic terminal 90 can be provided with a dome button, and screen unlocking may be triggered by pressing the dome button with a finger of a user. When the electronic terminal 90 is in a screen-off lock-screen state, the processor 901 may be further configured to trigger the operation of counting recorded debug parameters used for selecting target fingerprint images in the most recent N instances to determine a most frequently used debug parameter, when a finger touch operation is detected via the dome button before an operation instruction of pressing the dome button is received.

In one implementation, the processor 901 configured to identify whether the target fingerprint image satisfies the unlocking condition and unlock the screen of the electronic terminal when the unlocking condition is satisfied can be further configured to: identify whether the target fingerprint image matches with a preset image for unlocking authentication, and unlock and light up the screen of the electronic terminal when the target image is matched and the operation instruction of pressing the dome button is received.

It is to be noted that the electronic terminal 40 or the electronic terminal 90 according to the implementation of the present disclosure includes, but is not limited to, a mobile phone, a mobile computer, a tablet PC, a personal digital assistant (PDA), a media player, a smart television, a smart watch, a pair of smart glasses, smart hand ring, and another user equipment.

It should be noted that, the function of each functional module of the electronic terminal 40 or the electronic terminal 90 in implementations of the present disclosure can be implemented according to the method of the above method implementations, and the implementation thereof can refer to the method implementations described above, and will not be described in further detail herein.

Figure 10:
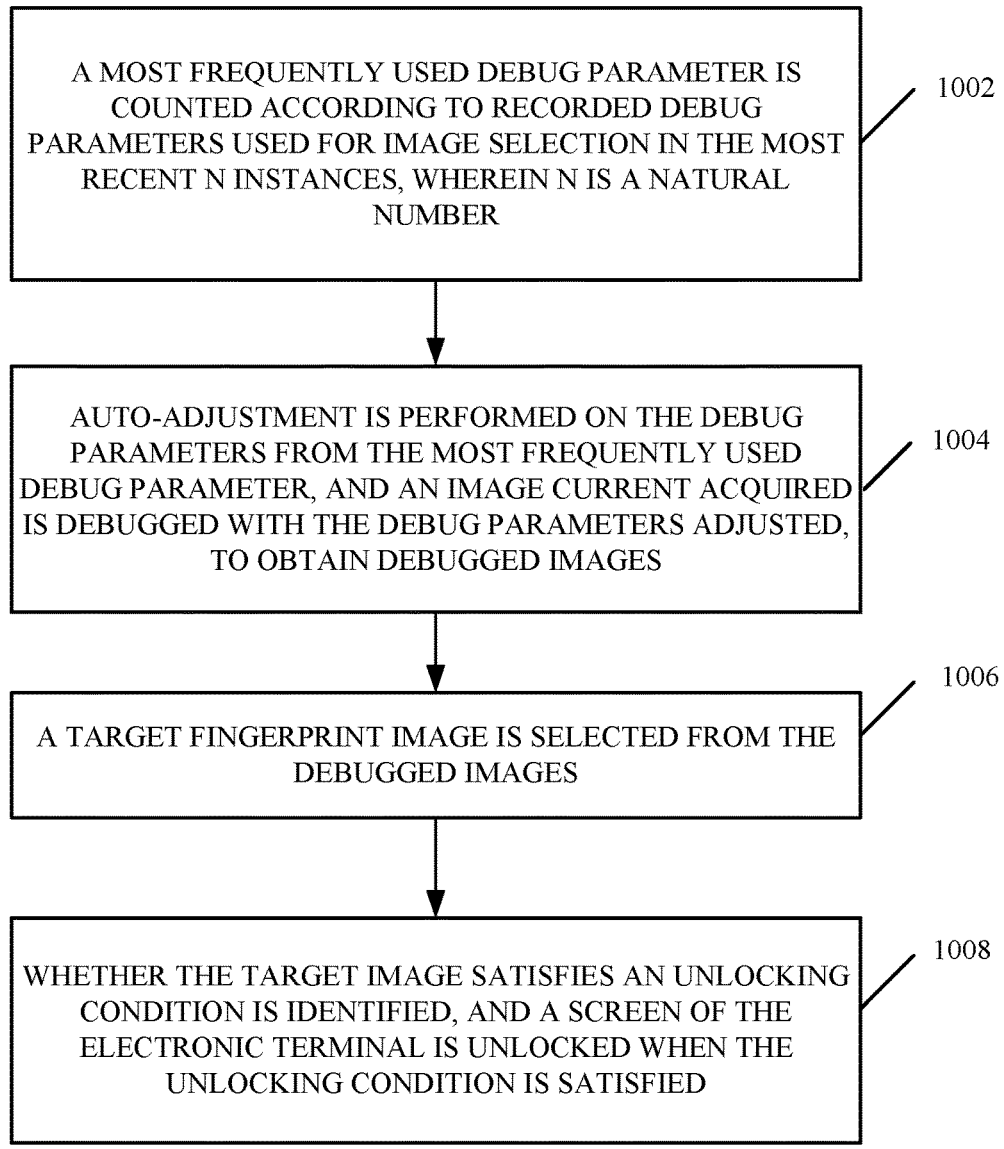
FIG. 10 is a schematic flow diagram illustrating a method for screen unlocking of an electronic terminal according to an implementation of the present disclosure.

FIG. 10 is a schematic flow diagram illustrating a screen unlocking method for an electronic terminal according to an implementation of the present disclosure. As illustrated in FIG. 10, the method begins at block 1002.

At block 1002, a most frequently used debug parameter is counted according to recorded debug parameters used for image selection in the most recent N instances, where N is a natural number and the debug parameters include CAC parameters. The debug parameters are adjusted for several times when the electronic terminal acquires a fingerprint image entered by a user through an acquiring module, to process the fingerprint image acquired with the debug parameters adjusted each time, to select a target fingerprint image. The CAC parameters include at least one of a gain parameter, an ADC parameter, and a pixel gain parameter.

At block 1004, auto-adjustment is performed on the debug parameters from the most frequently used debug parameter, and an image current acquired is debugged with the debug parameters adjusted, to obtain debugged images.

At block 1006, a target image is selected from the debugged images.

At block 1008, whether the target image satisfies an unlocking condition is identified, and a screen of the electronic terminal is unlocked when the unlocking condition is satisfied.

In one implementation, operations of selecting the target image from the debugged images include the following. Signal-to-noise ratios of the debugged images are compared; an image with the largest signal-to-noise ratio is selected as the target image.

In one implementation, the electronic terminal is provided with a dome button and screen unlocking is triggered by pressing the dome button with a finger of a user; where the method further includes the follows when the electronic terminal is in a screen-off lock-screen state. The determining a most frequently used debug parameter is triggered according to recorded debug parameters used for image selection in the most recent N instances, when a finger-touch is detected through the dome button before receiving an operation instruction of pressing the dome button.

In one implementation, operations of identifying whether the target image satisfies the unlocking condition and unlocking the screen of the electronic terminal when the unlocking condition is satisfied include as follows. Whether the target image matches with a preset image for unlocking authentication is identified. The screen of the electronic terminal is unlocked and lit up, when the target image is matched and the operation instruction of pressing the dome button is received.

Figure 11:
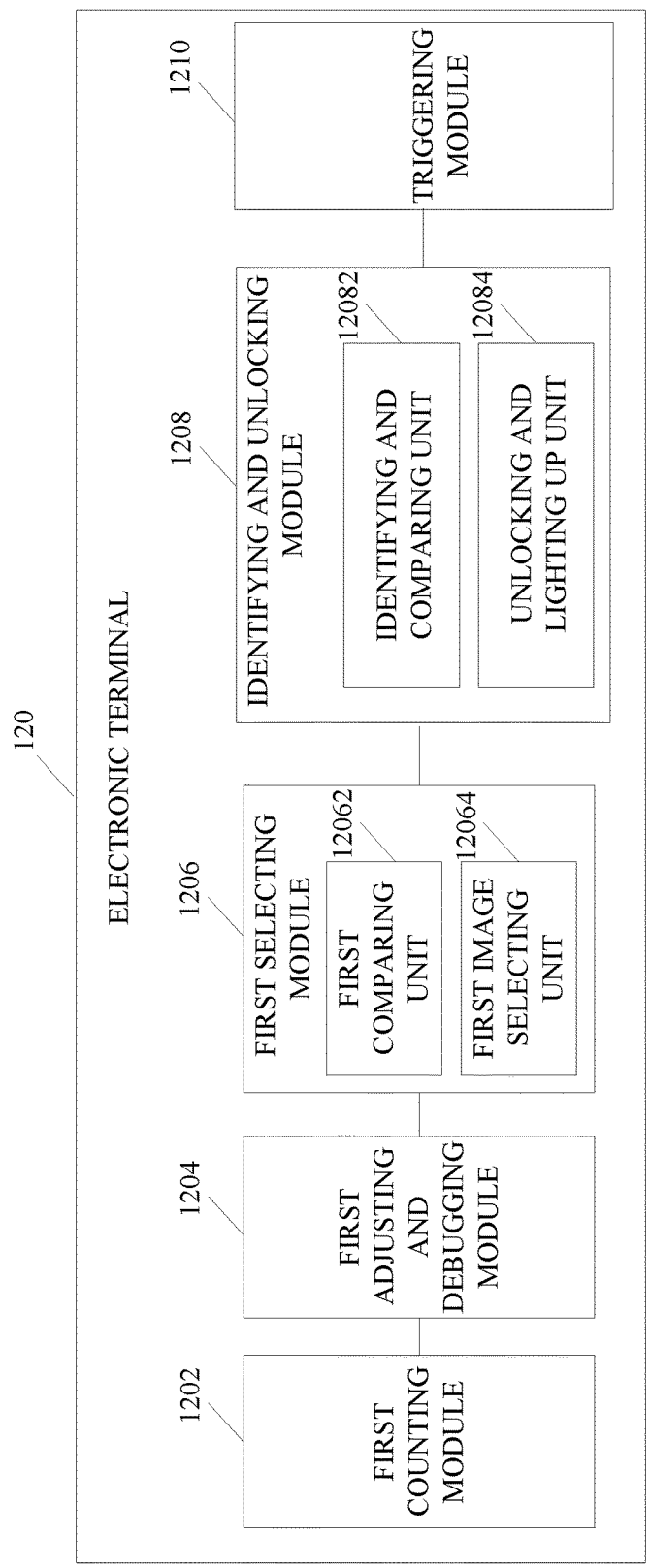
FIG. 11 is a schematic structural diagram illustrating an electronic terminal according to another implementation of the present disclosure.

FIG. 11 is a schematic structural diagram illustrating an electronic terminal according to another implementation of the present disclosure. As illustrated in FIG. 11, the electronic terminal 120 includes a first counting module 1202, a first adjusting and debugging module 1204, a first selecting module 1206, and an identifying and unlocking module 1208.

The first counting module 1202 is configured to count a most frequently used debug parameter according to recorded debug parameters used for image selection in the most recent N instances, where N is a natural number and the debug parameters include CAC parameters. The debug parameters are adjusted for several times when the electronic terminal 120 acquires a fingerprint image entered by a user through an acquiring module, to process the fingerprint image acquired with the debug parameters adjusted each time, to select a target fingerprint image; where the CAC parameters includes at least one of a gain parameter, an ADC parameter, and a pixel gain parameter.

The first adjusting and debugging module 1204 is configured to perform auto-adjustment on the debug parameters from the most frequently used debug parameter, and debugging an image current acquired with the debug parameters adjusted, to obtain debugged images.

The first selecting module 1206 is configured to select a target image from the debugged images;

The identifying and unlocking module 1208 is configured to identify whether the target image satisfies an unlocking condition, and to unlock a screen of the electronic terminal when the unlocking condition is satisfied.

In one implementation, the first selecting module 1206 includes a first comparing unit 12062 and a first image selecting unit 12064.

The first comparing unit 12062 is configured to compare signal-to-noise ratios of the debugged images.

The first image selecting unit 12064 is configured to select an image with the largest signal-to-noise ratio as the target image.

In one implementation, the electronic terminal 120 is provided with a dome button and screen unlocking may be triggered by pressing the dome button with a finger of a user. The electronic terminal further includes a triggering module 1210 when the electronic terminal is in a screen-off lock-screen state. The triggering module 1210 is configured to trigger the determining a most frequently used debug parameter according to recorded debug parameters used for image selection in the most recent N instances, when a finger-touch is detected through the dome button before receiving an operation instruction of pressing the dome button.

In one implementation, the identifying and unlocking module 1208 includes an identifying and comparing unit 12082 and an unlocking and lighting up unit 12084.

The identifying and comparing unit 12082 is configured to identify whether the target image matches with a preset image for unlocking authentication.

The unlocking and lighting up unit 12084 is configured to unlock and light up the screen of the electronic terminal when the identifying and comparing unit identifies that the target image is matched and the operation instruction of pressing the dome button is received.

To sum up, in implementations of the present disclosure, the recorded debug parameters used for selecting target fingerprint images in the most recent N instances are counted, to determine the most frequently used debug parameter; current debug parameters can be adjusted based on the most frequently used debug parameter, to debug fingerprint images currently acquired; the target fingerprint image can be selected from the debugged fingerprint images, and the screen of the electronic terminal will be unlocked when identifying that the target fingerprint image satisfies the unlocking condition. The present disclosure only needs to adjust debug parameters a small number of times to achieve the acquisition of fingerprint images, reducing the number of times to adjust debug parameters, resolving the problem in the related art that acquisition of fingerprint images takes a long time due to dozens or even hundreds of adjustments on debug parameters, thereby increasing the efficiency of fingerprint image acquisition, reducing screen unlocking time, and enabling the user to unlock the screen safely and quickly and therefore, improving user experience.

The implementation of the present disclosure also provides a computer storage medium, which may store program that includes part or all of the steps of the screen unlocking method of any of the electronic terminals described in the above-described method implementation.

It will be understood by those of ordinary skill in the art that implementing all or part of the processes in the method of the implementations described above may be accomplished by a computer program that commands the associated hardware, the computer program may be stored in a computer readable storage medium. When executing the computer program, the flow of implementations of the various methods described above may be included. Wherein the storage medium may be a magnetic disk, an optical disk, a read-only memory (ROM), a random access memory (RAM), or the like.

While the disclosure has been described above in detail in reference to some exemplary implementations, the scope of the disclosure is not limited thereto. As will occur to those of ordinary skill in the art that all the implementations described above as well as the equivalent substitutes of the appended claims shall all fall in the scope of the disclosure.

What is claimed is:

1. A computer-implemented method, using at least one hardware processor, for screen unlocking of an electronic terminal, comprising:

counting recorded debug parameters used for selecting target fingerprint images in a most recent N instances, wherein N is a natural number and the debug parameters comprise capacity auto control (CAC) parameters, wherein the CAC parameters comprise at least one of a gain of an analog-to-digital converter (ADC), an offset of the ADC, or a pixel gain, wherein the debug parameters for an instance of the most recent N instances are adjusted for several times when the electronic terminal acquires a fingerprint image, wherein the fingerprint image is processed with the debug parameters adjusted each time to obtain processed fingerprint images, wherein selecting a target fingerprint image for the instance comprises selecting one of the processed fingerprint images having a highest clarity;

ranking the recorded debug parameters in a descending order according to frequencies of use of the recorded debug parameters;

determining a most frequently used debug parameter from the ranked recorded debug parameters;

performing, by the at least one hardware processor, auto-adjustment on current debug parameters based on the most frequently used debug parameter;

after performing the auto-adjustment, obtaining debugged images by debugging a current image acquired with the current debug parameters;
selecting, from among the debugged images, a new target image having a highest clarity of the debugged images; and
unlocking a screen of the electronic terminal when the new target image satisfies an unlocking condition.

2. The method of claim 1, wherein the selecting the new target image having the highest clarity of the debugged images comprises:
comparing signal-to-noise ratios of the debugged images; and
selecting an image with the largest signal-to-noise ratio as the new target image.

3. The method of claim 1, wherein the electronic terminal is provided with a dome button and screen unlocking is triggered by pressing the dome button with a finger of a user; wherein the method further comprises the follows when the electronic terminal is in a screen-off lock-screen state:
triggering the counting of the recorded debug parameters used for selecting the target fingerprint images in the most recent N instances when a finger-touch is detected through the dome button before receiving an operation instruction of pressing the dome button.

4. The method of claim 3, wherein the identifying whether the new target image satisfies an unlocking condition, and the unlocking a screen of the electronic terminal when the unlocking condition is satisfied comprises:
identifying whether the new target image matches with a preset image for unlocking authentication; and
unlocking and lighting up the screen of the electronic terminal, when the new target image is matched and the operation instruction of pressing the dome button is received.

5. A computer-implemented method, using at least one hardware processor, for image acquiring, comprising:
acquiring images through an acquiring module;
counting recorded debug parameters used for selecting target fingerprint images in a most recent N instances, wherein N is a natural number and the debug parameters comprise CAC parameters, wherein the CAC parameters comprise at least one of a gain of an analog-to-digital converter (ADC), an offset of the ADC, or a pixel gain, wherein the debug parameters for an instance of the most recent N instances are adjusted for several times when the electronic terminal acquires a fingerprint image, wherein the fingerprint image is processed with the debug parameters adjusted each time to obtain processed fingerprint images, wherein selecting a target fingerprint image for the instance comprises selecting one of the processed fingerprint images having a highest clarity;
ranking the recorded debug parameters in a descending order according to frequencies of use of the recorded debug parameters:
determining a most frequently used debug parameter from the ranked recorded debug parameters;
performing, by the at least one hardware processor, auto-adjustment on current debug parameters based on the most frequently used debug parameter;
after performing the auto-adjustment, obtaining debugged images by debugging a current image acquired with the current debug parameters; and
selecting, from among the debugged images, a new target image having a highest clarity of the debugged images.

6. The method of claim 5, wherein the selecting the new target image having the highest clarity of the debugged images comprises:
comparing signal-to-noise ratios of the debugged images; and
selecting an image with the largest signal-to-noise ratio as the new target image.

7. An electronic terminal, comprising:
a memory configured to store executable program code; and
a hardware processor coupled to the memory, wherein the hardware processor is configured to execute the executable program code to:
count recorded debug parameters used for selecting target fingerprint images in a most recent N instances, wherein N is a natural number and the debug parameters comprise CAC parameters, wherein the CAC parameters comprise at least one of a gain of an analog-to-digital converter (ADC), an offset of the ADC, or a pixel gain, wherein the debug parameters for an instance of the most recent N instances are adjusted for several times when the electronic terminal acquires a fingerprint image, wherein the fingerprint image is processed with the debug parameters adjusted each time to obtain processed fingerprint images, wherein selecting a target fingerprint image for the instance comprises selecting one of the processed fingerprint images having a highest clarity; rank the recorded debug parameters in a descending order according to frequencies of use of the recorded debug parameters:
determine a most frequently used debug parameter from the ranked recorded debug parameters;
perform auto-adjustment on current debug parameters based on the most frequently used debug parameter;
after the auto-adjustment is performed, obtain debugged images by debugging current image acquired with the debug parameters;
select, from among the debugged images, a new target image having a highest clarity of the debugged images; and
unlock a screen of the electronic terminal when the new target image satisfies an unlocking condition.

8. The electronic terminal of claim 7, wherein the executable program code executed by the hardware processor to select the new target image having the highest clarity of the debugged images includes executable program code that, when executed by the hardware processor, causes the hardware processor to:
compare signal-to-noise ratios of the debugged images; and
select an image with the largest signal-to-noise ratio as the new target image.

9. The electronic terminal of claim 7, wherein the electronic terminal is provided with a dome button and screen unlocking may be triggered by pressing the dome button with a finger of a user; wherein the executable program code executed by the hardware processor includes executable program code that, when executed by the hardware processor when the electronic terminal is in a screen-off lock-screen state, causes the hardware processor to:
trigger the counting of the recorded debug parameters used for selecting the target fingerprint images in the most recent N instances when a finger-touch is detected through the dome button before receiving an operation instruction of pressing the dome button.

10. The electronic terminal of claim 9, wherein the executable program code executed by the hardware processor to unlock the screen of the electronic terminal when the new target image satisfies the unlocking condition includes executable program code that, when executed by the hardware processor, causes the hardware processor to:
- identify whether the new target image matches with a preset image for unlocking authentication; and
- unlock and light up the screen of the electronic terminal when the new target image is matched and the operation instruction of pressing the dome button is received.

11. The method of claim 1, further comprising:
recording the current debug parameter used to obtain the new target image.

12. The method of claim 1, wherein performing the auto-adjustment on the current debug parameters based on the most frequently used debug parameter comprises:
- performing the auto-adjustment on the current debug parameters by using the ranked recorded debug parameters sequentially starting from the most frequently used debug parameter.

13. The method of claim 5, further comprising:
recording the current debug parameter used to obtain the new target image.

14. The method of claim 5, wherein performing the auto-adjustment on the current debug parameters based on the most frequently used debug parameter comprises:
- performing the auto-adjustment on the current debug parameters by using the ranked recorded debug parameters sequentially starting from the most frequently used debug parameter.

15. The electronic terminal of claim 7, wherein the executable program code executed by the hardware processor includes executable program code that, when executed by the hardware processor, causes the hardware processor to:
- record the current debug parameter used to obtain the new target image.

16. The electronic terminal of claim 7, wherein the executable program code executed by the hardware processor to perform the auto-adjustment on the current debug parameters based on the most frequently used debug parameter includes executable program code that, when executed by the hardware processor, causes the hardware processor to:
- perform the auto-adjustment on the current debug parameters by using the ranked recorded debug parameters sequentially starting from the most frequently used debug parameter.

\* \* \* \* \*